United States Patent [19]
Irvine

[11] Patent Number: 5,857,558
[45] Date of Patent: Jan. 12, 1999

[54] CONNECTOR FOR ATTACHING ITEMS TO A CHAIN FOR A PACKAGING MACHINE

[75] Inventor: Robert H. Irvine, Brainerd, Minn.

[73] Assignee: Riverwood International Corporation, Atlanta, Ga.

[21] Appl. No.: 726,534

[22] Filed: Oct. 7, 1996

Related U.S. Application Data

[60] Provisional application No. 60/018,884, May 31, 1996.
[51] Int. Cl.$^6$ .................................................. B65G 17/14
[52] U.S. Cl. .................................. 198/803.2; 198/867.14
[58] Field of Search ........................... 198/803.2, 803.01, 198/867.12, 867.14

[56] References Cited

U.S. PATENT DOCUMENTS

| | | |
|---|---|---|
| 4,196,561 | 4/1980 | Kruse . |
| 4,388,990 | 6/1983 | Michalik . |
| 4,402,393 | 9/1983 | Kent .................................... 198/803.01 |

OTHER PUBLICATIONS

Riverwood International Corporation, Applicant's Assignee, Drawing Figure 1 Serial No.: 08/726,354, Dated Filed: Oct. 7, 1996.

U.S. Ser. No. 352,164, Aasted, filed May 1943.

K. C. S. Aasted, "Conveyor Mechanism for Use in Connection with Machines for Casting Chocolate and the Like." Alien Property Custodian, May 18, 1943.

*Primary Examiner*—Joseph E. Valenza
*Assistant Examiner*—Mark Deuble
*Attorney, Agent, or Firm*—Skinner & Associates; Steve McLary

[57] ABSTRACT

A connector for attaching items to a chain typically used on packaging machines. An elongated body spans two extended link pins of a chain, and has at least one hole for attaching items. Offset tabs on each end of the body receive a link pin and allow tabs of adjacent connectors to overlap and pivot on the same link pin. A series of connectors can be installed adjacently on an endless chain to create a top and bottom surface to which items can be attached. The connectors manually install across two link pins of a chain and can be easily replaced if needed without untensioning or disassembling the chain. Retainers are not needed for the connectors when chains are used in pairs and items are attached between the two chains.

14 Claims, 2 Drawing Sheets

CONNECTOR FOR ATTACHING ITEMS TO A CHAIN FOR A PACKAGING MACHINE

CROSS-REFERENCE TO RELATED APPLICATIONS

This application claims the benefit under 35 USC §119(e) of co-pending U.S. Provisional application Ser. No. 60/018,884, filed May 31, 1996.

BACLGROUND OF THE INVENTION

1. Field of the Invention

The present invention relates, generally, to packaging machines. More particularly, the invention relates to conveyance mechanisms of packaging machines. The invention has particular utility in endless chain conveyance mechanisms of packing machines. However, the invention also may be found to have utility in other applications.

2. Background Information

In a typical packaging machine for placing groups of articles, such as bottles or cans, within individual cartons, the cartons are in a collapsed form, called a blank, at one end of the packaging machine. Articles to be packaged are also fed in mass into one end of the machine. The machine opens a carton blank, groups and positions articles to be placed in the carton; brings the group of articles and carton together; then closes and seals the carton, and dispenses it out the other end of the machine.

The continuous motion of all the articles, cartons, packaged articles and mechanisms of the packaging machine is synchronized by mechanical and electronic devices. One of the most common mechanical devices used is a is an endless chain. The uniform spacing of chain links provide repeatable uniform positioning of items attached to the chain. Such items include flight bars for separating articles into groups, conveyor members for moving articles, pop-up conveyor members for maintaining separation of grouped articles, lugs for moving cartons, and barrel cam cross loading mechanisms for pushing grouped articles into cartons. A typical packaging machines will have a number of endless chain systems, each performing a different function, and each with different items attached. Typically each chain system includes a pair of parallel chains. When a packaging machine is changed for a different run, items to various chains are often changed to accommodate different article size, article type, group size, and package size and type. Therefore, chains must have the ability to have items attached to them readily attached and removed.

A prior art mechanism for attaching items to chains is shown of FIG. 1. Links of chains have a bent attachment plate formed by one link plate being bent about 90°. Holes in the attachment plate allow items to be attached to either the top or bottom of the attachment plate with bolts. Because the attachment plate is too thin for the holes to be effectively threaded, nuts (not shown) are often welded to one side of the attachment plate.

If flat conveyor members, for example, are attached to each attachment plate, the intention is that when the chain is tensioned, the bracket surfaces all align and the conveyor members all align to form a smooth conveyor line. When a chain is tensioned, the load is reacted at each link pin and all the pins align. However, due to the manufacturing variation of the bent attachment plates, or the attachment plate being further bent after manufacturing, the mounting surfaces of the attachment plates do not align uniformly as the pins. Consequently, there may be steps between adjacent items attached to the chain. A conveyor line made in this fashion would have bumps in it, which can disrupt the flow of articles through the machine by causing unnecessary jostling of articles, misalignment of articles and/or cartons, or tipping over of articles which can shut down, jam, or even damage the packaging machine.

While it is possible to remove the serious bumps from a conveyor by shimming the offending items, that is a time consuming and impractical solution, and one which would need to be done every time items are changed.

Furthermore, if a link in the chain has a mounting bracket that is unusable because, for example, it is bent too much out of alignment, the link then has to be disassembled and replaced. That requires a time consuming operation of untensioning the chain, knocking two link pins out, changing the link, pressing link pins back in, and retensioning the chain.

Despite the need in the art for a connector for attaching items to chains which overcomes the disadvantages, shortcomings and limitations of the prior art, none insofar as is known has been developed.

Accordingly, it is an object of the present invention to provide an improved connector for attaching items to chains which minimizes the height variation of the mounting surfaces.

It is a further object of this invention to provide an improved connector for attaching items to chains which bases the alignment of the connectors' mounting surfaces on the link pins of the chain.

It is a further object of this invention to provide an improved connector for attaching items to chains which are easily separable from the chain without disassembly of the chain.

BRIEF SUMMARY OF THE INVENTION

The apparatus of the present invention provided a connector for attaching items to a chain typically used on packaging machines. The connector is an elongated body which spans two extended link pins of a chain. The connector has at least one hole or other means for attaching items such as conveyor members, flight bars, lugs, or cross loading mechanisms. Each end of the connector has a tab offset to one side of the connector's centerline, and each tab has a hole to receive a link pin. The offset tabs allow tabs of adjacent connectors to overlap on the same link pin, and the geometry of the tabs allows the connectors to pivot on the link pins without interfering with each other as the chain passes over a sprocket. A series of connectors can be installed adjacently on a continuous chain to create a top and bottom surface to which items can be attached. Because the connectors use the chain link pins for alignment, there is little variation in the top and bottom mounting surfaces from one connector to another. The connectors manually install across two link pins of a chain and can be easily replaced if needed without untensioning or disassembling the chain. Retainers are not needed for the connectors when chain are used in pairs and items are attached between the two chains.

The features, benefits and objects of this invention will become clear to those skilled in the art by reference to the following description, claims and drawings.

DETAILED DESCRIPTION

Figure 1:
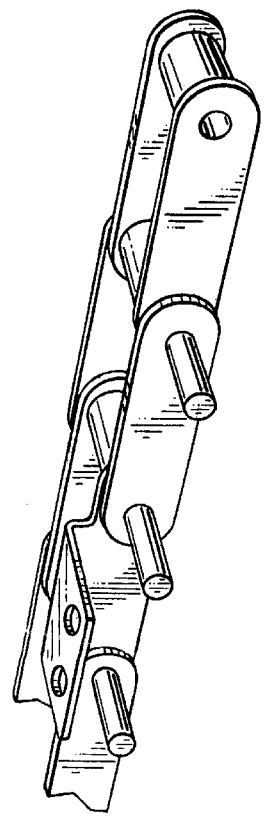
FIG. 1 is a perspective view of a prior art device for attaching items to chains.

Referring to FIG. 1, a typical roller chain used on packaging and other type of machines comprises roller links 100 and pin links 110 connected in series. Roller link 100 consists of a pair of roller link plates 102, rollers 104 mounted between roller link plates 102, and bushings (not shown) inside of rollers 104. Pink link 110 consists of a pair of pin link plates 112 and link pins 114. Each bushing in rollers 104 has a hole 106 which accepts a link pin 114. Link pins 114 extend through pin link plates 112 and are typically press-fit into holes in pin link plates 112 to securely assemble roller links 100 and pin links 110.

Also shown in FIG. 1 is a prior art mechanism for attaching items to chains. Link plates 102 of 112 can have an extension which is bent about 90° to form an attachment plate 120. Holes 122 in attachment plate 120 typically allow items to be attached to either the top or bottom of the attachment plate with threaded fasteners. However, due to manufacturing variation of the bent attachment plates, or the attachment plates being further bent after manufacturing, the mounting surfaces of the attachment plates do not always align as uniformly as intended. Consequently, there may be undesirable steps between adjacent items attached to the chain.

The present invention solves that problem by providing connectors which rely directly on the chain link pins for alignment. Because variation inherent to connectors of the present invention are much less than those to the prior art bent plate connectors, the alignment of top and bottom surfaces of connectors of the present invention is better than with the prior art bent plate connectors.

Figure 2:
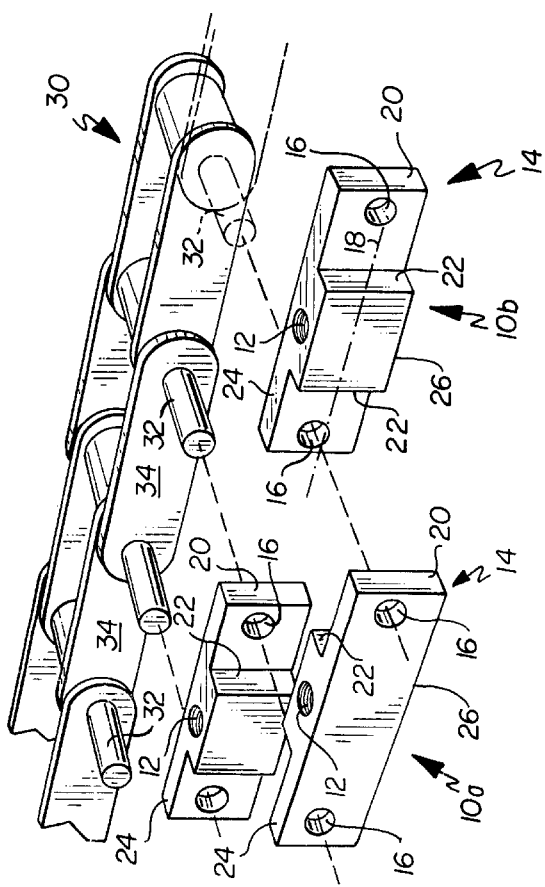
FIG. 2 is a partially exploded perspective view of a chain with connectors of the present invention for attaching items to chains.

Referring to FIG. 2, an example of the preferred embodiment of the present invention is illustrated and generally indicated by the reference numeral 10. The connector 10 has an elongated configuration of sufficient length to span between two chain link pins 32, which are elongated to extend the pin link plates 34 on one side of a chain 30. Connector 10 can be applied to a pair of link pins 32 at either the pin link plate 34 position (as connector 10b is) or the roller link plate 36 position (as connector 10a). Link pins 32 are preferably sufficiently long to receive two connectors 10a and 10b in the orientations shown in FIG. 2.

Connector 10 has at least one hole 12 for attaching items such as conveyor members, flight bars, or cross loading mechanisms. Hole 12 is preferably on centerline 18 of connector 10. In the preferred embodiment hole 12 is threaded to receive a screw. Threads in hole 12 are preferably made in the substrate material of connector 10, but alternatively threads may be provided by a threaded insert installed in hole 12. Hole 12 may also be a through hole for receiving a bolt or pin, or hole 12 may be any other configuration which necessary for specialty fasteners. There are many specialty fasteners, some of which have two-part mating elements. As an alternative to hole 12, one of the mating elements of such a fastener could be installed in or integrally formed in connector 10.

Connector 10 has a tab 14 on each end. Each tab has a hole 16 for receiving a link pin 32. Tabs 14 are offset to one side of the centerline 18 of connector 10 and in the preferred embodiment are approximately half the thickness T of connector 10. Such a tab configuration allows connectors 10a and 10b to be installed on link pins 32, as shown in FIG. 2, such that tabs 14 of two adjacent connectors 10a and 10b overlap and holes 12 are aligned. That tab configuration also allows all the connectors 10 to be installed whether they are installed in the orientation of connector 10a or 10b since connector 10b is merely connector 10a flipped 180°. It also makes removal of any connector simple. A connector in the 10a orientation can be removed without affecting adjacent connectors. A connector in the 10b orientation requires removal of only the two adjacent connectors in the 10a orientation to allow its removal. The position of hole 16 in tab 14 is such that when connectors 10 are installed adjacently as shown in FIG. 2, and 20 of tabs 14 will clear faces 22 at the base of tabs 14 as connectors 10 pivot on link pins 32 when chain 30 goes around a sprocket (not shown).

Holes 16 are of a diameter to provide minimum clearance for link pins 32 and allow connector 10 to easily be manually installed on link pins 32 and pivot on them without undue friction. If a connector 10 requires replacement for any reason, it can be easily removed and replaced by hand without disassembling or even untensioning the chain.

Connector 10 may be fabricated using a variety of materials and methods. They may be machined from plastic stock such as DELRIN or TEFLON, or machined from metal such as aluminum, brass or steel. They may also be cast in metal or molded in plastic depending on the requirements for each use.

Figure 3:
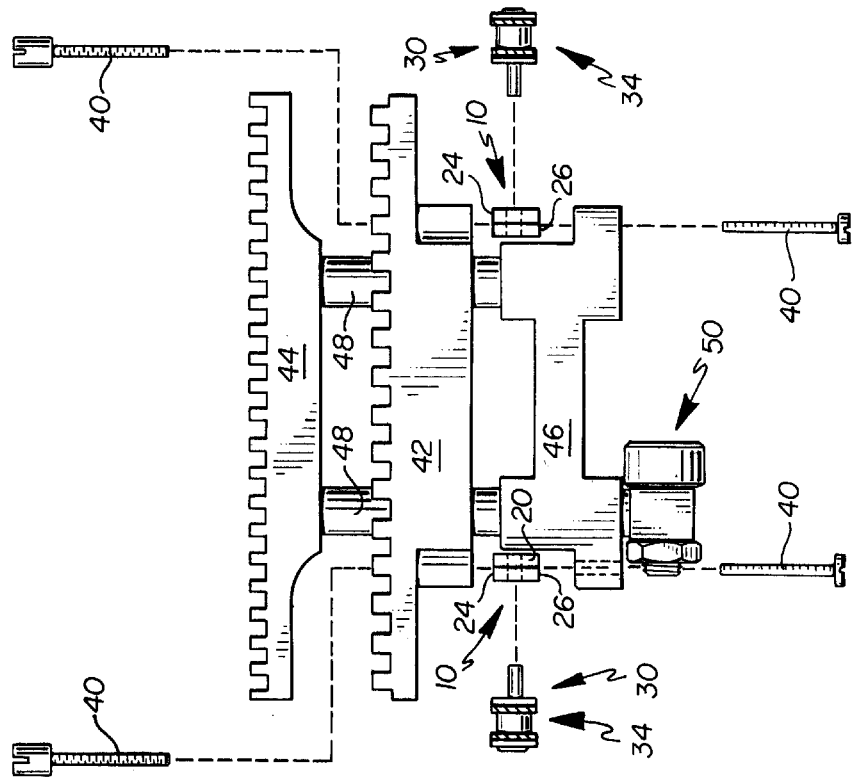
FIG. 3 is a partially exploded end view of an assembly showing how conveyor members can be attached to chains using connectors of the present invention.
Figure 4:
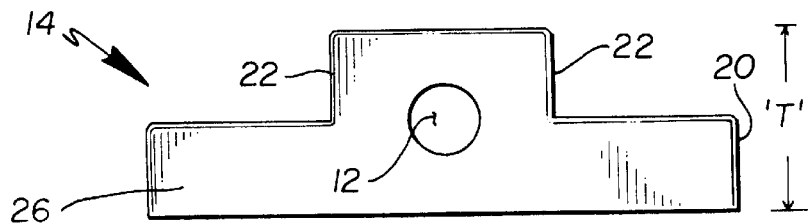
FIG. 4 is a top view of a connector of the present invention.
Figure 5:
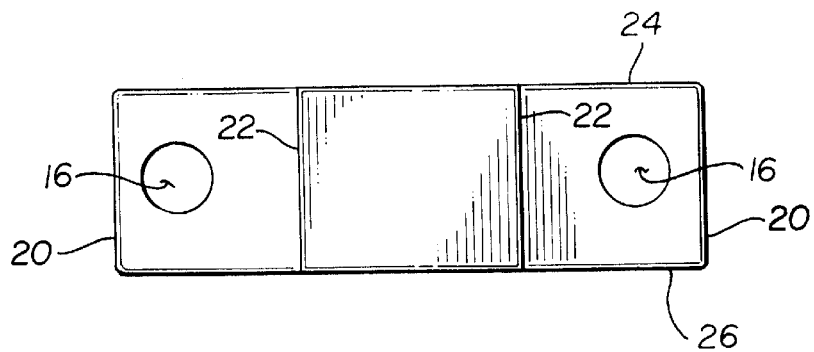
FIG. 5 is a front view of a connector of the present invention.
Figure 6:
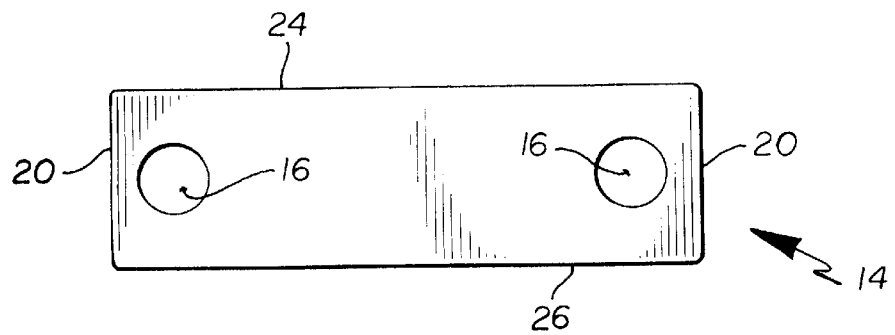
FIG. 6 is a back view of a connector of the present invention.
Figure 7:
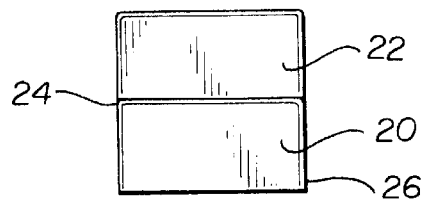
FIG. 7 is an end view of a connector of the present invention.

On packaging machines chains are typically used in pairs with attached items mounted between the two chains. Referring to FIG. 3, connectors of the present invention are used to attach conveyor members to a pair of chains. Chain 30 has elongated link pins 32 which receive connectors 10. No retainer is needed on link pins 32 to keep connectors 10 on link pins 32 when a pair of chains 30 are oriented as shown with link pins 32 facing each other. With conveyor members attached to connectors 10, connectors 10 cannot move axially on link pins 32 enough to fall of link pins 32.

Items can be attached to connector 10 on either the top surface 24 or bottom surface 26 of connector 10. In the preferred embodiment, top surface 24 and bottom surface 26 are flat, smooth, and parallel, but they need not be. The mounting surfaces may instead have features, such as a contour or an elastomeric coating. Typically top-attaching devices and bottom-attaching devices are attached to separate connectors, although it is also possible to attach devices to the top and bottom surfaces of the same connector. The ability to attach devices to either the top or bottom of the connector is very useful on conveyors using pop-up conveyor segments among fixed conveyor segments to contain groups of articles. Fixed conveyor segments 42 are attached to the top surface 24 of some connectors 10 using screws 40 installed from the top. Pop-up conveyor segments are attached to the bottom of other connectors 10 using screws 40 also installed from the top. For those installations, hole 47 in base 46 is threaded and hole 12 in connector 10 us a clearance hole for screw 40. It is also possible to install screws from the bottom into threaded holes 12 in connectors 10, however, it may not be practical to do so.

A pop-up conveyor segment has a surface element 44 fixedly attached to rails 48 which slide in holes (not shown) in base 46. The configuration of the assembled parts is such that in its down position (not shown), surface element 44 is even with fixed conveyor segment 42 when base 46 is mounted on the bottom surface 26 of connectors 10. A cam follower 50 is attached to at least one rail 48. As chains 30 carry the conveyor segments through the packaging machine, at the desired location a cam (not shown) pushed cam follower 50 up which raises rails 48 and surface element 44 higher than fixed conveyor segments 42 thereby constraining articles on fixed conveyor segments 42 between pop-up segments.

Besides a top and bottom mounting surface, a connector of the present invention may incorporate other features which interact with other items attached to the connectors. Because the connectors are readily removed and installed on a chain without untensioning or disassembling the chain, this invention allows such features to be relatively easily added or removed to a chain whereas prior art chains may have had those features as integral parts of their links which and would have required changing the links and/or the entire chain to change the features.

Referring to FIGS, 4, 5, 6 and 7 details of connector 10 are shown in the top, front, back, and end views respectively. In the preferred embodiment, hole 12 extends through connector 10 from top surface 24 to bottom surface 26, but alternatively hole 12 may be a blind hole.

The descriptions above and the accompanying drawings should be interpreted in the illustrative and not the limited sense. While the invention has been disclosed in connection with the preferred embodiment or embodiments thereof, it should be understood that there may be other embodiments which fall within the scope and the invention as defined by the following claims. Where a claim is expressed as a means or step for preforming a specified function it is intended that such claim be construed to cover the corresponding structure, material, or acts described in the specifications and equivalents thereof, including both structural equivalents and equivalent structures.

What is claimed is:

1. A connector for attaching items to chains, mounted on extended link pins of a chain, comprising a body having a pair of apertures for receiving said link pins, said body having a means for attaching items to it, said body being elongated hand having a center portion and end portions, each of said end portions having a tab extending longitudinally from said center portion, said apertures for receiving said link pins passing transversely through said tabs, said center portion having a longitudinal centerline, said tabs being offset from said longitudinal centerline to allow tabs of two adjacent connectors to overlap on a single link pin without interfering with each other or with the chain on which said connector is mounted, said adjacent connectors having identical structures, said tabs having a thickness approximately one-half that of said center portion to keep said longitudinal centerline of adjacent connectors aligned, said means for attaching being at least one aperture centrally located in said body along said longitudinal centerline, said at least one aperture running orthogonally to said apertures for receiving link pins, and said body being not a structural part of the chain.

2. The connector of claim 1 wherein said at least on aperture has threads.

3. The connector of claim 1 wherein said body has a planar top surface.

4. The connector of claim 1 wherein said body has a planar bottom surface.

5. The connector of claim 1 wherein said body has a planar top surface and a planar bottom surface.

6. The connector of claim 5 wherein said top and bottom surfaces are parallel.

7. The connector of claim 1 wherein said body is made of plastic.

8. A connector for attaching items to chains, mounted on extended link pins of a chain, comprising an elongated body having:
   (a) a planar top surface;
   (b) a planar bottom surface parallel to said top surface;
   (c) a center portion having a longitudinal centerline and at least one aperture located along said centerline for attaching items to said center portion;
   (d) end portions with each end portion having a tab extending longitudinally from the center portion, each tab having an aperture passing transversely through said tab for receiving a link pin;
   (e) wherein said at least one aperture in said center portion runs orthogonally to said apertures in said tabs and is located along said longitudinal centerline;
   (f) wherein said tabs share a side of said body and are offset to one side of said longitudinal centerline to allow tabs of two adjacent connectors to overlap on a single link pin without interfering with each other or with the chain on which said connector is mounted, said adjacent connectors having identical structures, said adjacent connectors having an alternating configuration where one of said adjacent connectors is rotated 180 degrees about a central axis parallel with said at least one aperture;
   (g) wherein said tabs have a thickness approximately one-half that of said center portion to keep said longitudinal centerline of adjacent connectors aligned; and
   (h) wherein said body is not a structural part of the chain.

9. A chain and connector assembly for attaching items to the assembly, comprising:
   (a) a chain comprised of roller links and pin links, each roller link comprising
       (i) a pair of spaced parallel roller link plates having two ends,
       (ii) a pair of rollers, each roller having a center axis, the rollers mounted between the roller link plates, one roller at each end of the link plates, the axis of the rollers orthogonal to the roller link plates, and
       (iii) a pair of bushings, one bushing inside of each roller,
   each pin link comprising
       (i) a pin of spaced parallel pin link plates having two ends, and
       (ii) a pair of link pins attached to the pin link plates, oriented orthogonally to the pin link plates, one link pin mounted at each of said pin link plates and spanning both pin link plates,
   the roller links and the pin links being assembled in alternating sequence such that the ends of roller link plates are between the ends of pin link plates and a link pin of a pin link passes through a bushing of a roller link;
   (b) extended link pins extending beyond the pin link plates for a length on at least one side of the pin link;
   (c) a plurality of connectors, each connector spanning two of the extended link pins and mounted on the length of the extended link pins which extends beyond the pin link plates; and (d) wherein each connector comprises a body having a pair of apertures for receiving said link pins, said body having a means for attaching items to it, said body being elongated and having a center portion and end portions, each of said end portions having a tab extending longitudinally from said center portion, said apertures for receiving said link pins passing transversely through said tabs, said center portion having a longitudinal centerline, said tabs being offset from said longitudinal centerline to allow tabs of two adjacent connectors to overlap on a single link pin without interfacing with each other or with the chain on which said connector is mounted, said adjacent connectors having identical structures, said tabs having a thickness approximately one-half that of said center portion to keep said longitudinal centerline of adjacent connectors aligned, said means for attaching being at least one aperture centrally located in said body along said longitudinal centerline, said at least one aperture running orthogonal to said apertures for receiving link pins, and said body being not a structural part of the chain.

10. The assembly of claim 9 wherein:

(a) said adjacent connectors have an alternating configuration where one of said adjacent connectors is rotated 180 degrees about a central axis parallel with said at least one aperture;

(b) said body is elongated and has
  (i) a planar top surface, and
  (ii) a planar bottom surface parallel to said top surface and;

(c) said tabs share a side of said body and are offset to one side of said longitudinal centerline.

11. A cooperating set of chain and connector assemblies for attaching items to the set comprising:

(a) a pair of parallel chains with each chain comprising roller links and pin links, each roller link comprising
  (i) a pair of spaced parallel roller link plates having two ends,
  (ii) a pair of rollers, each roller having a center axis, the rollers mounted between the roller link plates, one roller at each end of the link plates, the axis of the rollers orthogonal to the roller link plates, and
  (iii) a pair of bushings, one bushing inside of each roller,
each pin link comprising
  (i) a pair of spaced parallel pin link plates having two ends, and
  (ii) a pair of link pins attached to the pin link plates, oriented orthogonally to the pin link plates, one link pin mounted at each end of said pin link plates and spanning both pin link plates,
the roller links and the pin links being assembled in alternating sequence such that the ends or roller link plates are between the ends of pin link plates and a link pin of a pin link passes through a bushing of a roller link;

(b) extended link pins extending beyond the pin link plates for a length on at least one side of the pin links, and each chain oriented so that the extended link pins extend in opposite directions;

(c) a plurality of connectors, each connector spanning two of the extended link pins on one chain of said pair of chains and mounted on the length of the extended link pins which extends beyond the pin link plates;

(d) wherein each connector comprises a body having a pair of apertures for receiving said link pins, said body having a means for attaching items to it, said body being elongated and having a center portion and end portions, each of said end portions having a tab extending longitudinally from said center portion, said apertures for receiving said link pins passing transversely through said tabs, said center portion having a longitudinal centerline, said tabs being offset from said longitudinal centerline to allow tabs of two adjacent connectors to overlap on a single link pin without interfering with each other or with the chain on which said connector is mounted, said adjacent connectors having identical structures, said tabs having a thickness approximately one-half that of said center portion to keep said longitudinal centerline of adjacent connectors aligned, said means for attaching being at least one aperture centrally located in said body along said longitudinal centerline, said at least one aperture running orthogonal to said apertures for receiving link pins, and said body being not a structural part of the chain.

12. The set of claim 11 wherein:

(a) said adjacent connectors have an alternating configuration where one of said adjacent connectors is rotated 180 degrees about a central axis parallel with said at least one aperture;

(b) said body is elongated and has
  (i) a planar top surface, and
  (ii) a planar bottom surface parallel to said top surface and;

(c) said tabs share a side of said body and are offset to one side of said longitudinal centerline.

13. A cooperating set of chain, connector, and conveyor member assemblies comprising:

(a) a pair of parallel chains with each chain comprising roller links and pin links, each roller link comprising
  (i) a pair of spaced parallel roller link plates having two ends,
  (ii) a pair of rollers, each roller having a center axis, the roller mounted between the roller link plates, one roller at each end of the link plates, the axis of the rollers orthogonal to the roller link plates, and
  (iii) a pair of bushings, one bushing inside of each roller, each pin link comprising
  (i) a pair of spaced parallel pin link plates having two ends, and
  (ii) a pair of link pins attached to the pin link plates, oriented orthogonally to the pin link plates, one link pin mounted at each end of said pin link plates and spanning both pin link plates;
the roller links and the pin links being assembled in alternating sequence such that the ends of roller link plates are between the ends of pin link plates and a link pin of a pin link passes through a bushing of a roller link;

(b) extended link pins extending beyond the pin link plates for a length on at least one side of the pin links, and each chain oriented so that the extended link pins extend in opposite directions;

(c) a plurality of connectors, each connector spanning two of the extended link pins on one chain of said pair of chains and mounted on the length of the extended link pins which extends beyond the pin link plates;

(d) wherein each connector comprises a body having a pair of apertures for receiving said link pins, said body having a means for attaching items to it, said body being elongated and having a center portion and end portions, each of said end portions having a tab extending longitudinally from said center position, said apertures for receiving said link pins passing transversely through said tabs, said center portion having a longitudinal centerline, said tabs being offset from said longitudinal centerline to allow tabs of two adjacent connectors to overlap on a single link pin without interfering with each other or with the chain on which said connector is mounted, said adjacent connectors having identical structures, said tabs having a thickness approximately one-half that of said center portion to keep said longitudinal centerline of adjacent connectors aligned, said means for attaching being at least one aperture centrally located in said body along said longitudinal centerline, said at least one aperture running orthogonal to said apertures for receiving link pins, and said body being not a structural part of the chain; and (e) a plurality of conveyor members, each conveyor member comprising a body having a first end attached to a connector on one chain of the pair of chains and a second end attached to a connector or another chain of the pair of chains.

14. The set of claim 13 wherein:

(a) said adjacent connectors have an alternating configuration where one of said adjacent connectors is rotated 180 degrees about a central axis parallel with said at least one aperture;

(b) said body is elongated and has
 (i) a planar top surface, and
 (ii) a planar bottom surface parallel to said top surface and;

(c) said tabs share a side of said body and are offset to one side of said longitudinal centerline.

* * * * *